(12) United States Patent
Ugiansky

(10) Patent No.: US 8,887,435 B2
(45) Date of Patent: Nov. 18, 2014

(54) WALL-LESS TRAP SYSTEMS AND METHODS

(76) Inventor: Bobby D. Ugiansky, Austin, TX (US)

(*) Notice: Subject to any disclaimer, the term of this patent is extended or adjusted under 35 U.S.C. 154(b) by 463 days.

(21) Appl. No.: 13/158,845

(22) Filed: Jun. 13, 2011

(65) Prior Publication Data

US 2011/0308137 A1 Dec. 22, 2011

Related U.S. Application Data

(60) Provisional application No. 61/397,768, filed on Jun. 16, 2010.

(51) Int. Cl.
*A01M 23/22* (2006.01)

(52) U.S. Cl.
CPC ..................... *A01M 23/22* (2013.01)
USPC .................................................. 43/62; 43/60

(58) Field of Classification Search
USPC ................ 43/58, 60–62, 64, 67; 414/594
See application file for complete search history.

(56) References Cited

U.S. PATENT DOCUMENTS

| | | | | |
|---|---|---|---|---|
| 413,877 | A * | 10/1889 | Thrift | 43/62 |
| 5,024,021 | A * | 6/1991 | Wang | 43/62 |
| 6,658,788 | B1 * | 12/2003 | Steinfest | 43/61 |
| 8,375,847 | B1 * | 2/2013 | Anganes | 99/407 |

\* cited by examiner

*Primary Examiner* — David Parsley
*Assistant Examiner* — Timothy Schwarz
(74) *Attorney, Agent, or Firm* — Law Offices of Mark L. Berrier

(57) ABSTRACT

One embodiment is a wall-less trap that includes a base, vertical supports, an upper cage, one or more guides connected to the upper cage, and a trigger. The base is positioned on a horizontal surface. The vertical supports extend upward from the base. The upper cage is movable between a raised position, in which the upper cage is suspended above the base, and a lowered position, in which the upper cage rests on the base or the horizontal surface. The guides are connected to the upper cage and slide on the vertical supports to guide vertical travel of the upper cage. The trigger can be either engaged to hold the upper cage in the raised position, or disengaged to allow the upper cage to fall downward from the raised position. The trigger is movable from the engaged position to the disengaged position by an animal positioned under the upper cage.

11 Claims, 4 Drawing Sheets

WALL-LESS TRAP SYSTEMS AND METHODS

CROSS-REFERENCE TO RELATED APPLICATIONS

This application claims the benefit of U.S. Provisional Patent Application 61/397,768, filed Jun. 16, 2010, which is incorporated by reference as if set forth herein in its entirety.

BACKGROUND

1. Field of the Invention

The invention relates generally to animal trapping hunting, and more particularly to systems and methods for trapping wild animals using a wall-less trap that facilitates luring the animals into the proper position to close the trap and capture the animals.

2. Related Art

Feral hogs can cause a great deal of damage to crops, eating some and simply destroying others. The hogs can ruin springs and ponds by creating mud wallows, thereby affecting wildlife habitats. Still further, feral hogs are predators, and may kill deer fawns, goat kids and other small animals. They may even attack humans. The problems caused by feral hogs are increasing because the number of hogs is increasing (they are prolific breeders), and because feral hogs are relatively intelligent and consequently difficult to trap.

Traps that are used to capture feral hogs are conventionally completely enclosed except for one (or sometimes two) trap doors. The hogs are expected to enter the enclosure and trigger a release mechanism that closes the door(s), trapping the animal inside the enclosure. These traps may be difficult to set because the trigger mechanisms for the door(s) of the trap are often either too sensitive or not sensitive enough. Additionally, feral hogs typically are wary of the enclosures and will simply refuse to go inside. Obviously, if the hogs do not enter these traps, they cannot be captured in the traps.

Even when a hog is captured in a conventional trap, the design of the trap may present some difficulties. For example, when a hog or other animal is captured in the trap, it may necessary to transport the animal type location and release it, but it may be difficult and dangerous to release the animal because this may place the trapper in close proximity to the animal. It is also sometimes necessary for the trapper to actually crawl into the enclosure to retrieve an animal that has died in the trap, or has been injured and cannot or will not exit the trap on its own. Occasionally, a dead or injured animal will fall against the door, making it even more difficult for the trapper to retrieve the animal from the enclosure.

SUMMARY OF THE INVENTION

This disclosure is directed to systems and methods that solve one or more of the problems discussed above. The present systems and methods provide improved means to trap animals such as feral hogs. These systems and methods use wall-less traps that are less likely to alert a wild animal to their presence, and are more easily accessed to retrieve or release a captured animal.

One embodiment comprises a wall-less trap. This trap includes a base, one or more vertical supports, an upper cage, one or more guides connected to the upper cage, and a trigger. The base is designed to be positioned on a horizontal surface such as the ground. The vertical supports are connected to the base and extend upward from the base. The upper cage is movable between raised and lowered positions. In the raised position, the upper cage is suspended above the base, providing a wall-less area below it. In the lowered position, the upper cage rests on the base or the horizontal surface, forming a closed cage. The guides are connected to the upper cage, and are configured to slide on the vertical supports to guide the vertical travel of the upper cage. The trigger can be either engaged or disengaged. When the trigger is in the engaged position, the trigger holds the upper cage in the raised position. When the trigger is in the disengaged position, the upper cage is allowed to fall downward from the raised position. The trigger is movable from the engaged position to the disengaged position by an animal positioned under the upper cage.

The trap may include an upper structure connected to the vertical supports, where when the upper cage is in the raised position, the upper cage is suspended from this upper structure. In one embodiment, a first, latch portion of the trigger is connected to a center portion of the upper structure and a second, hook portion of the trigger is connected to a center portion of the upper cage. The trigger may utilize bearings to minimize friction and increase the sensitivity of the trigger. The trap may include a winch which is releasably connected to the upper cage, so that the winch can raise the upper cage to be engaged by the trigger, and then be released so that the upper cage can fall when the trigger is disengaged. The guides may comprise tubes that are positioned around corresponding ones of the vertical supports. The guides may be configured to be prevented from sliding on the vertical support when the guides and vertical supports are misaligned, in order to prevent the upper cage from being raised by an off-center force. The trap may include a safety to prevent the upper cage from falling when the safety is engaged.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
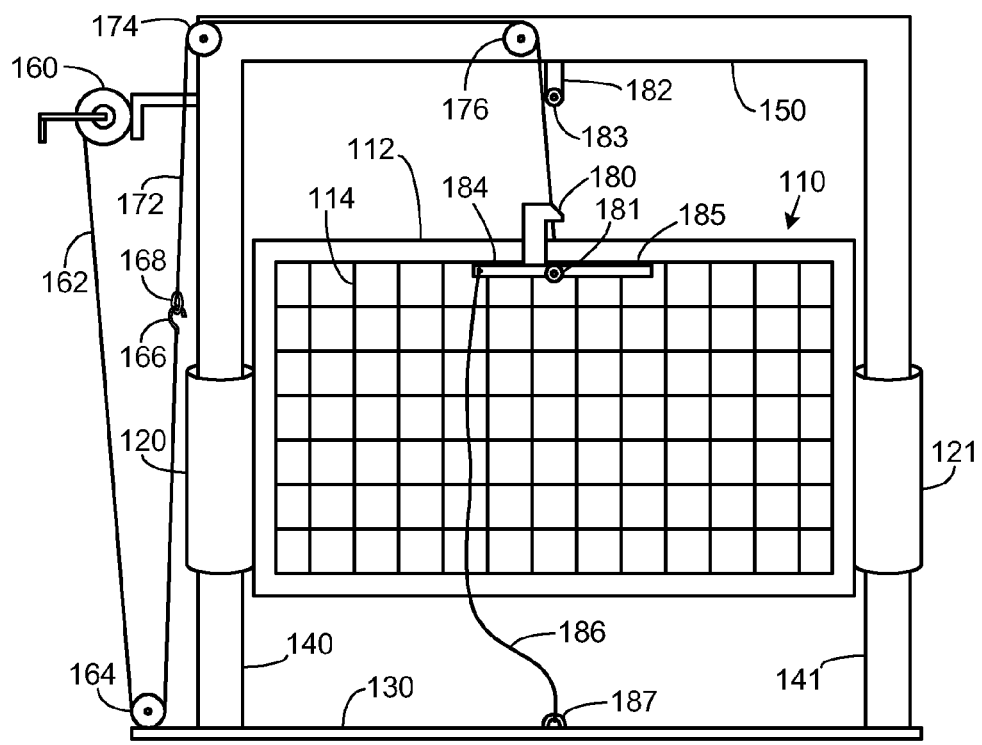
FIG. 1 is a diagram illustrating a front view of a trap in accordance with one embodiment, where an upper cage portion of the trap is partially raised.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for trapping wild animals using a wall-less trap that facilitates luring the animals into the proper position to close the trap and capture the animals.

Figure 2:
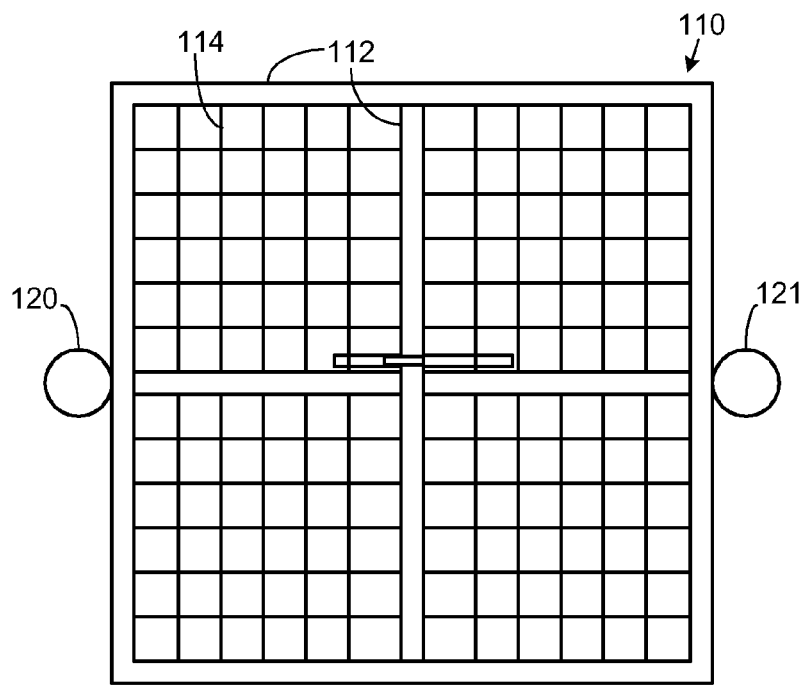
FIG. 2 is a diagram illustrating a top view of the upper cage of the embodiment of FIG. 1.
Figure 3:
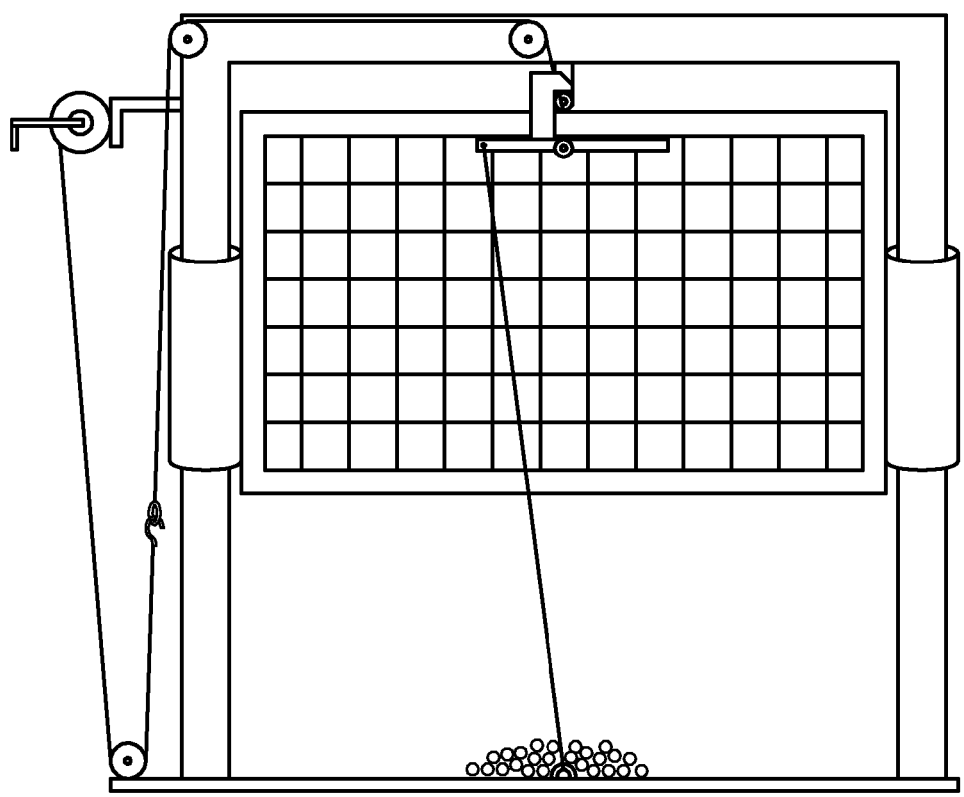
FIG. 3 is a diagram illustrating a front view of the embodiment of FIG. 1, where the upper cage portion of the trap is completely raised and latched.
Figure 4:
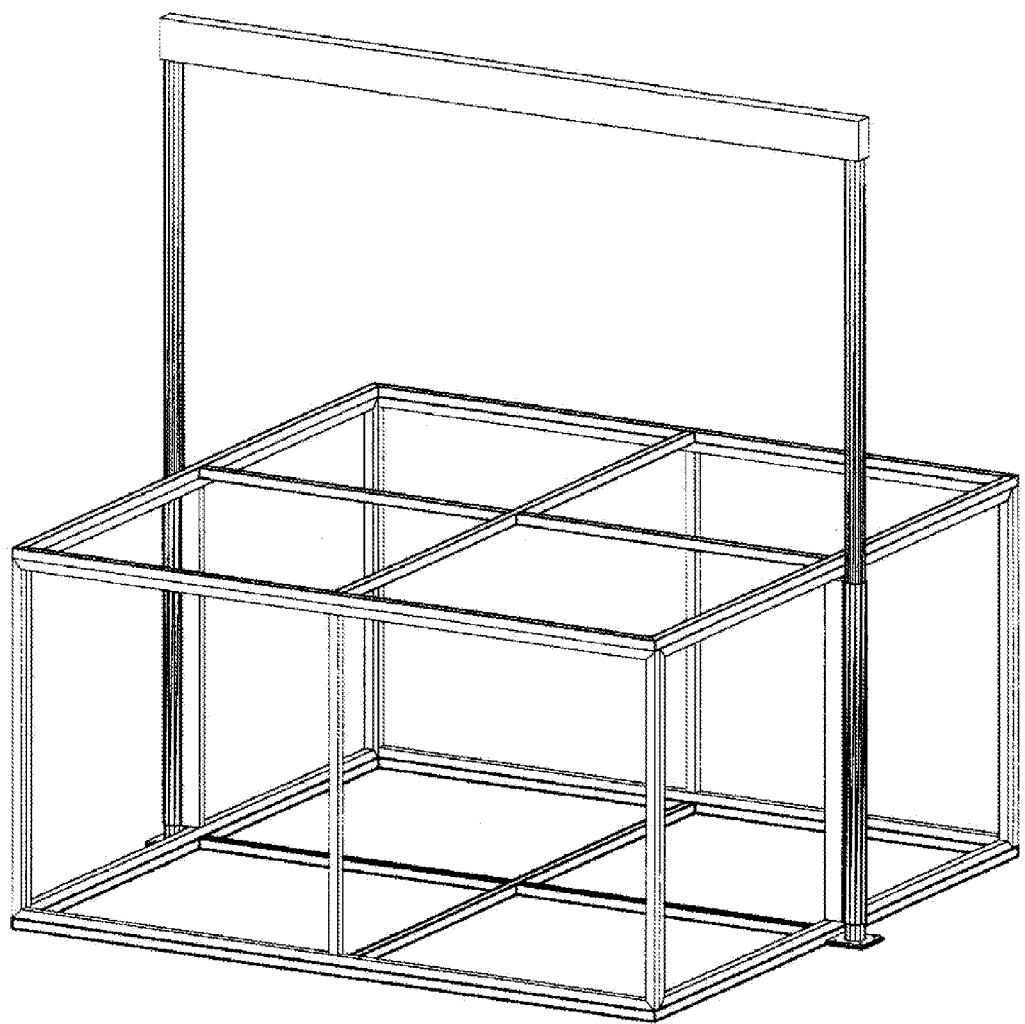
FIG. 4 is a perspective view of the frame portion of the trap, where the upper cage is in a lowered position.
Figure 5:
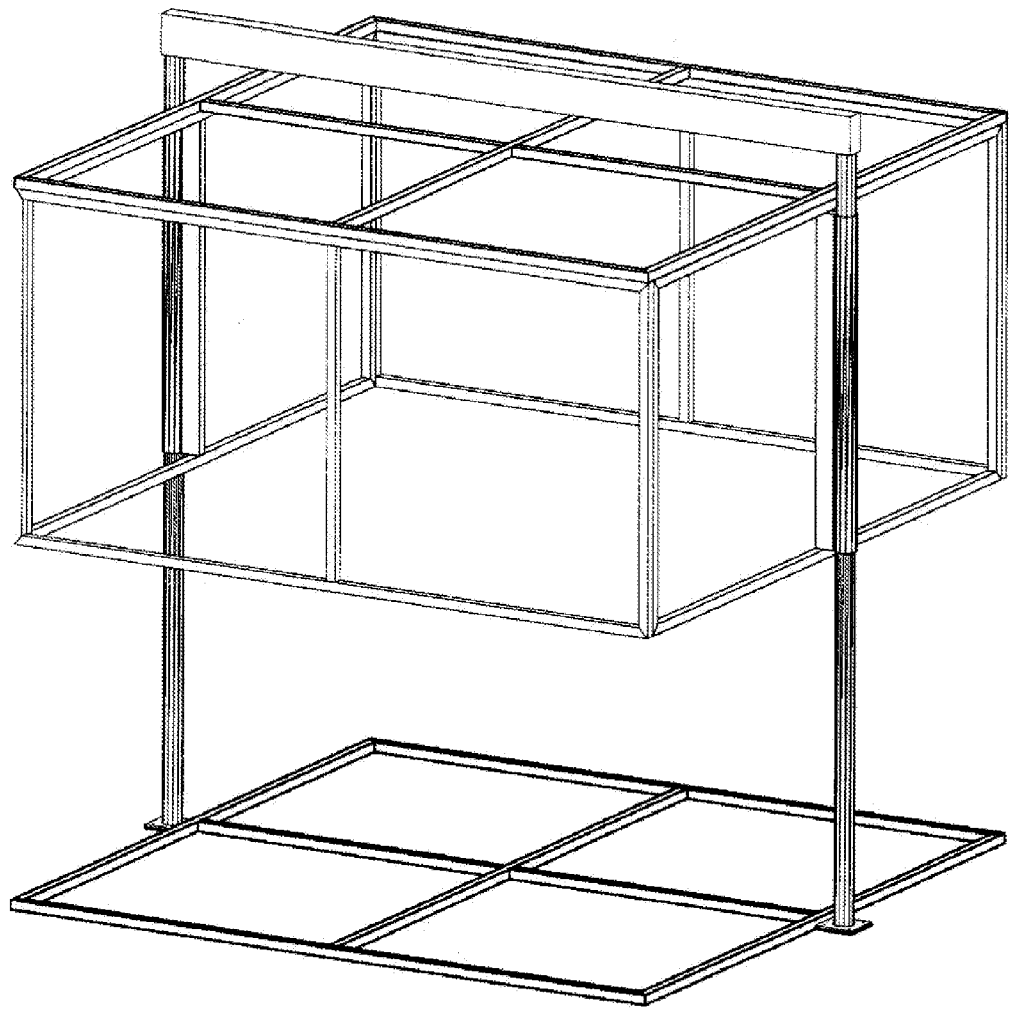
FIG. 5 is a perspective view of the frame portion of the trap, where the upper cage is in a raised position.

Referring to FIGS. 1-5, an exemplary embodiment of a wall-less trap that is suitable for capturing feral hogs and other wild animals is illustrated. The primary components of the trap are an upper cage or bottomless enclosure, and a guide structure that guides the vertical travel of the upper cage and supports the upper cage in a raised position until it is released to trap the animal. FIG. 1 is a diagram illustrating a front view of a trap in accordance with one embodiment, where an upper cage portion of the trap is partially raised. FIG. 2 is a diagram illustrating a top view of the upper cage of the embodiment of FIG. 1. FIG. 3 is a diagram illustrating a front view of the embodiment of FIG. 1, where the upper cage portion of the trap is completely raised and latched. FIGS. 4 and 5 are perspective views of the frame portion of the trap, where the upper cage is in a lowered position in FIG. 4 and a raised position in FIG. 5.

In the embodiment of FIGS. 1-5, upper cage 110 is generally square. Upper cage 110 has four sides and a top, but no bottom. Upper cage 110 has a welded steel frame 112 with heavy gauge wire 114 welded to the frame. When upper cage 110 is sitting on the ground or a cage base, a completely enclosed cage is formed (i.e., by the five walls of the cage and the ground or base). The open base of the upper cage enclosure allows the raised to be dropped when an animal is below it, thereby trapping the animal within the enclosure. This is particularly advantageous when dealing with relatively intelligent animals such as feral hogs, which are often wary of closed spaces such as conventional trap enclosures and will refuse to enter such enclosures. When using the present system, the walls of the trap are above the animal and out of its sight, so the animal is more likely to come within the area below the upper cage, where it can be captured.

It should be noted that upper cage 110 may have any suitable shape, and need not be square, as shown in FIGS. 1-5. In one alternate embodiment, upper cage 110 has a cylindrical shape, with a circular wall and flat top. In fact, such a shape may increase the ease of construction of the upper cage, as it may require less welding than a square shape or other shapes that have corners.

Upper cage 110 has a pair of guides (120, 121) that are attached to the outside of frame 112. In this embodiment, guides 120 and 121 are simply tubes that are welded onto the frame. Guides 120 and 121 are vertically oriented so that when they are positioned on corresponding vertical supports, they constrain upper cage 110 to travel vertically along the supports.

In addition to the movable upper cage, the trap of FIGS. 1-5 also includes a stationary structure. This structure includes a base 130, vertical supports 140 and 141, and an upper support 150. Base 130 is a flat frame that sits on the ground. Because the base 130 is on the ground, it may not be necessary to have the same heavy wire mesh that is on upper cage 110. If, however, it is desired to be able to pick up the trap and transport it with an animal inside, the wire mesh or some other floor will be required on the base. Vertical supports 140 and 141 are welded to base 130, and extend upward through guides 120 and 121. The upper ends of vertical supports 140 and 141 are connected to an upper support 150.

It should be noted that, while the embodiment of FIGS. 1-5 uses two vertical supports, alternative embodiments may use a different number. The two supports shown in the figures provide sufficient support for the raised upper cage, but also minimize the appearance of the trap to animals on the ground, which is important when trapping cautious animals such as feral hogs.

Upper support 150 stabilizes the vertical supports and provides means to raise and support upper cage 110. A winch 160 is connected to vertical support 140. Winch 160 is connected via cables 162 and 172 to the top of upper cage 110. A user can crank winch 160 to wind cable 162 onto the winch. Table 162 passes through pulley 164 and terminates at hook 166. When hook 166 is connected to loop 168, cable 162 pulls cable 172 through pulleys 174 and 176, thereby pulling upper cage 110 upward.

The embodiment of FIGS. 1-5 includes a hook-and-latch mechanism to secure upper cage 110 and to trigger release of the upper cage. A hook 180 is connected to the top of upper cage 110. A latch 182 is connected to upper support 150. When upper cage 110 is raised to the top of vertical supports 140 and 141, hook 180 engages latch 182 as shown in FIG. 3.

In this embodiment, latch 182 has a bearing 183 which contacts hook 180. Bearing 183 is provided to minimize the friction between the hook and the latch. Because the weight of upper cage 110 is supported by latch 182, there would be a great deal of friction between hook 180 and the latch if the latch were stationary. The use of bearing 183 allows hook 180 to roll off the latch with very little friction. This allows the hook-and-latch mechanism to engage and disengage very easily.

Hook 180 also employs a bearing 181 at the point at which the hook pivots. This bearing minimizes the friction with which hook 180 pivots, allowing the hook-and-latch mechanism to engage and disengage very easily. Hook 180 also has a trigger arm 184 and a counterbalance arm 185.

Trigger arm 184 is connected to one end of a trigger cable 186. The other end of trigger cable 186 is connected to an attachment point 187 in the middle of base 130. It can be seen that the length of trigger cable 186 is adjusted so that the trigger cable is slack when upper cage 110 is not fully raised (FIG. 1) and is tight when upper cage 110 is fully raised (FIG. 3). When upper cage 110 has been completely raised and the latch has been engaged, bait is placed around attachment point 187. When an animal enters the area below upper cage 110 and eats the bait, the animal will bump into trigger cable 186. This will pull trigger arm 184 downward, disengaging hook 180 from latch 182 and allowing upper cage 110 to fall, trapping the animal.

Counterbalance arm 185 provides sufficient weight to counterbalance the weight of trigger arm 184 and provide a very small amount of force to urge hook 180 toward a vertical position. Thus, as upper cage is raised, the top of hook 180 contacts bearing 183 and is pushed to the left. When upper cage 110 has been raised enough for hook 180 to be above bearing 183, the weight of counterbalance arm 185 pushes the hook to the right to engage the latch (on top of bearing 183). The use of counterbalance arm 185 eliminates some of the problems associated with springs that are conventionally used for this purpose, such as rusting or stretching, which can change the amount of force applied by the spring.

It should be noted that the use of two cables (162, 172) to raise upper cage 110 provides a safety mechanism for the trap. Winch 160 is a ratcheting type winch. When the ratchet is engaged, the winch can only be turned in the direction that winds cable 162 and raises upper cage 110. When upper cage 110 is resting on base 130, cable 162 is connected to cable 172 by placing hook 166 through loop 168. Winch 160 is then cranked (with the ratchet engaged) to raise upper cage 110. When upper cage 160 is raised sufficiently high for hook 180 to engage latch 182, the upper cage can be supported by the hook and latch, but cables 162 and 172 can remain connected as a safety. A person can then move under upper cage 110 to place bait around attachment point 187 without any danger of the upper cage falling and injuring the person if trigger cable 186 is accidentally bumped. After the bait has been positioned, and the user has moved out from under upper cage 110, and the cables (162, 172) can be disconnected from each other. At this point, the trap is set and ready for use.

As shown in FIGS. 1 and 3, cable 172 is connected to the top of upper cage 110 at its center. This arrangement maintains upper cage 110 in a balanced position in which guides 120 and 121 remain in alignment with vertical supports 140 and 141. This minimizes friction between the guides and the vertical supports and consequently minimizes the effort required to raise upper cage 110.

It should be noted that, when guides 120 and 121 are misaligned with vertical supports 140 and 141, there may be substantial friction between the guides and the vertical supports. This may be advantageous because a captured animal may be able to get underneath one of the outer edges of the upper cage and attempt to push it up far enough to escape. Since lifting an outer edge of the upper cage will misalign the guides and vertical supports and thereby increase the friction between them, it would be difficult, if not impossible, to raise the upper cage in this manner. It is therefore very difficult for animals to escape from the trap.

Because the animals that are desired to be trapped may be very cautious, it is desirable to deemphasize the appearance of the trap. A cover may be placed over the upper cage to camouflage the trap. This cover may, for example, use the same materials and designs as other camouflage devices (e.g., deer blinds).

Alternative embodiments of the invention may have numerous variations from the embodiments described above. For example, as noted above, the shape of the upper cage may vary in the different embodiments, and the number of vertical supports may vary. Likewise, the types of materials (e.g., steel, heavy gauge wire, cable, etc.) used in the construction of the trap, the specific mechanisms used to provide the described functions (e.g., hook-and-latch trigger, releasable cable safety, etc.) and other specifics of the described embodiment may be replaced with suitable materials and mechanisms in alternative embodiments. Still further, it should be noted that a number of the features described herein are optional, and many alternative embodiments omit one or more of these features.

While the present disclosure is directed primarily to the system set forth above, it should be noted that alternative embodiments include methods for use of this system, in addition to various alternative configurations of the system.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A wall-less trap system comprising:
   a base configured to be positioned on a substantially horizontal surface;
   two vertical supports connected to the base and extending upward from the base, wherein the vertical supports are positioned external to an upper cage, and wherein a center of the base is unobstructed by the vertical supports;
   the upper cage which is movable between a raised position in which the upper cage is suspended above the base, thereby providing a wall-less area below the upper cage, and a lowered position in which the upper cage rests on the base or the substantially horizontal surface, thereby forming a closed enclosure;
   a horizontal upper support connected to an upper end of each of the vertical supports;
   one or more guides connected to the upper cage, wherein the guides are configured to slide on the vertical supports and thereby guide vertical travel of the upper cage; and
   a trigger configured to be positioned in either an engaged position or a disengaged position, wherein when the trigger is in the engaged position the trigger holds the upper cage in the raised position, wherein when the trigger is in the disengaged position the trigger is disengaged from the upper cage, thereby allowing the upper cage to travel downward from the raised position, and wherein the trigger is movable from the engaged position to the disengaged position by an animal positioned under the upper cage, wherein the trigger comprises a movable hook and a stationary latch, wherein the latch includes a latch bearing, wherein in the engaged position, the hook engages the latch bearing, wherein the latch bearing reduces friction between the hook and the latch, wherein the hook includes a hook bearing, wherein the hook bearing enables the hook to pivot on the upper cage.

2. The wall-less trap system of claim 1, further comprising a trigger cable which is connected to the base and to a trigger arm which is connected to the hook, wherein the trigger cable is adjusted to be tight when the hook is engaged with the latch, and wherein additional tension on the trigger cable moves the trigger arm and disengages the hook from the latch.

3. The wall-less trap system of claim 1, further comprising a counterbalance arm which is connected to the hook, wherein a weight of the counterbalance arm biases the hook in a direction opposite the tension provided by the trigger cable on the trigger arm.

4. The wall-less trap system of claim 1, wherein a first portion of the trigger is connected to a center portion of the upper structure and a second portion of the trigger is connected to a center portion of the upper cage.

5. The wall-less trap system of claim 1, further comprising a winch which is coupled to the upper structure, wherein the winch is releasably connected to the upper cage, wherein when the winch is connected to the upper cage, the winch is configured to raise the upper cage from the lowered position to the raised position.

6. The wall-less trap system of claim 1, wherein the one or more guides comprise one or more tubes, wherein each of the tubes is positioned around a corresponding one of the vertical supports.

7. The wall-less trap system of claim 1, wherein when at least one of the one or more guides are misaligned with the corresponding vertical supports, the at least one misaligned guide resists sliding on the vertical support, thereby resisting the upper cage being raised by an off-center force applied to the upper cage.

8. The wall-less trap system of claim 1, further comprising a trigger cable connected between the hook and the base, wherein when the upper cage is in the raised position, the trigger cable is tight, and wherein moving the trigger cable will pull the hook and cause the hook to disengage from the latch.

9. The wall-less trap system of claim 1, wherein the trap includes a safety, wherein when the safety is on, the safety is configured to prevent the upper cage from falling toward the lowered position.

10. The wall-less trap system of claim 9, wherein the safety comprises a ratcheting winch which is releasably connected to the upper cage, wherein when the winch is connected to the upper cage, the winch is configured to allow the upper cage to be raised but not lowered.

11. The wall-less trap system of claim 10, wherein the winch is releasably connected to the upper cage by a pair of cables, one of which is connected to the winch, and the other of which is connected to the upper cage, wherein each of the pair of cables is releasably connected to the other.

\* \* \* \* \*